United States Patent
Murtha et al.

(10) Patent No.: US 10,029,927 B2
(45) Date of Patent: *Jul. 24, 2018

(54) MODULAR SAND FILTRATION-ANCHOR SYSTEM AND WAVE ENERGY WATER DESALINATION SYSTEM AND METHODS OF USING POTABLE WATER PRODUCED BY WAVE ENERGY DESALINATION

(71) Applicant: MURTECH, INC., Glen Burnie, MD (US)

(72) Inventors: Robert Murtha, Stevensville, MD (US); Michael E. McCormick, Annapolis, MD (US); Mark K. Washington, Middletown, DE (US)

(73) Assignee: Murtech, Inc., Glen Burnie, MD (US)

( * ) Notice: Subject to any disclaimer, the term of this patent is extended or adjusted under 35 U.S.C. 154(b) by 122 days.

This patent is subject to a terminal disclaimer.

(21) Appl. No.: 15/023,791

(22) PCT Filed: Sep. 18, 2014

(86) PCT No.: PCT/US2014/056243
§ 371 (c)(1),
(2) Date: Mar. 22, 2016

(87) PCT Pub. No.: WO2015/047855
PCT Pub. Date: Apr. 2, 2015

(65) Prior Publication Data
US 2016/0236950 A1 Aug. 18, 2016

Related U.S. Application Data

(63) Continuation of application No. 14/037,684, filed on Sep. 26, 2013, now Pat. No. 8,778,176, which is a (Continued)

(51) Int. Cl.
*C02F 1/44* (2006.01)
*B01D 61/06* (2006.01)
(Continued)

(52) U.S. Cl.
CPC ............ *C02F 1/441* (2013.01); *B01D 24/042* (2013.01); *B01D 24/14* (2013.01); *B01D 61/025* (2013.01);
(Continued)

(58) Field of Classification Search
None
See application file for complete search history.

(56) References Cited

U.S. PATENT DOCUMENTS

| 260,016 A | 6/1882 | Franklin |
| 344,813 A | 7/1886 | Bull |

(Continued)

FOREIGN PATENT DOCUMENTS

| CA | 1193490 | 9/1985 |
| CN | 201620995 | 11/2010 |

(Continued)

OTHER PUBLICATIONS

Bernitsas, et al., "VIVACE (Vortex Induced Vibration for Aquatic Clean Energy): A New Concept in Generation of Clean and Renewable Energy from Fluid Flow," Proceedings of OMAE2006, Paper OMAE06-92645, Hamburg, Germany Jun. 4-9, 2006, pp. 1-18.

(Continued)

*Primary Examiner* — Krishnan S Menon
(74) *Attorney, Agent, or Firm* — Caesar Rivise, PC

(57) ABSTRACT

A potable water producing system for disposition at a salt water body and methods of producing potable water are provided. The system includes a wave energy conversion system (AWECS) and a portable filtration-anchor system. The AWECS forms a floating articulated barge having a desalination system including a reverse osmosis membrane. The filtration-anchor system is submerged in the salt water body and includes a sand filter to filter the adjacent salt water for providing the filtered salt water to the desalination (Continued)

system on the articulated barge. Wave action on the articulated barge provides energy to pump the filtered salt water from the sand filter to the reverse osmosis member to produce potable water. The wave action on the articulated barge effects the shaking of the reverse osmosis filter, thereby rendering it self-cleaning. The potable water can be used for various applications, e.g., bottling, replenishing aquifers, ground and/or aquifer remediation, irrigation, etc.

20 Claims, 11 Drawing Sheets

Related U.S. Application Data continuation-in-part of application No. 13/929,171, filed on Jun. 27, 2013, now Pat. No. 8,784,653.

(60) Provisional application No. 62/028,895, filed on Jul. 25, 2014, provisional application No. 61/668,213, filed on Jul. 5, 2012.

(51) Int. Cl.
| | |
|---|---|
| B01D 61/08 | (2006.01) |
| C02F 1/00 | (2006.01) |
| B01D 24/04 | (2006.01) |
| B01D 24/14 | (2006.01) |
| F03B 13/14 | (2006.01) |
| B01D 61/04 | (2006.01) |
| E02B 9/08 | (2006.01) |
| E03B 1/02 | (2006.01) |
| F03B 13/20 | (2006.01) |
| B01D 61/02 | (2006.01) |
| B01D 65/02 | (2006.01) |
| C02F 103/02 | (2006.01) |
| C02F 103/08 | (2006.01) |

(52) U.S. Cl.
CPC .......... *B01D 61/04* (2013.01); *B01D 61/06* (2013.01); *B01D 61/08* (2013.01); *B01D 65/02* (2013.01); *C02F 1/004* (2013.01); *E02B 9/08* (2013.01); *E03B 1/02* (2013.01); *F03B 13/14* (2013.01); *F03B 13/20* (2013.01); *B01D 2101/04* (2013.01); *B01D 2201/26* (2013.01); *B01D 2311/04* (2013.01); *B01D 2313/06* (2013.01); *B01D 2313/243* (2013.01); *B01D 2313/36* (2013.01); *C02F 2103/02* (2013.01); *C02F 2103/08* (2013.01); *C02F 2201/008* (2013.01); *C02F 2201/009* (2013.01); *C02F 2303/16* (2013.01); *F05B 2220/62* (2013.01); *Y02E 10/38* (2013.01)

(56) References Cited

U.S. PATENT DOCUMENTS

| | | | |
|---|---|---|---|
| 1,078,323 | A | 11/1913 | Trull |
| 1,636,447 | A | 7/1927 | Standish |
| 2,731,799 | A | 1/1956 | Lange et al. |
| 3,022,632 | A | 2/1962 | Parks |
| 3,191,202 | A | 6/1965 | Handler |
| 3,376,588 | A | 4/1968 | Berteaux |
| 3,628,334 | A | 12/1971 | Coleman |
| 3,755,836 | A | 9/1973 | Milazzo |
| 3,818,523 | A | 6/1974 | Stillman, Jr. |
| 3,846,990 | A | 11/1974 | Bowley |
| 3,848,419 | A | 11/1974 | Bowley |
| 4,004,308 | A | 1/1977 | Gongwer |
| 4,048,802 | A | 9/1977 | Bowley |
| 4,077,213 | A | 3/1978 | Hagen |
| 4,098,084 | A | 7/1978 | Cockerell |
| 4,118,932 | A | 10/1978 | Sivill |
| 4,209,283 | A | 6/1980 | Marbury |
| 4,210,821 | A | 7/1980 | Cockrell |
| 4,255,066 | A | 3/1981 | Mehlum |
| 4,264,233 | A | 4/1981 | McCambridge |
| 4,280,238 | A | 7/1981 | van Heijst |
| 4,326,840 | A | 4/1982 | Hicks et al. |
| 4,335,576 | A | 6/1982 | Hopfe |
| RE31,111 | E | 12/1982 | Hagen |
| 4,408,454 | A | 10/1983 | Hagen et al. |
| 4,421,461 | A | 12/1983 | Hicks et al. |
| 4,512,886 | A | 4/1985 | Hicks et al. |
| 4,686,377 | A | 8/1987 | Gargos |
| 4,698,969 | A | 10/1987 | Raichlen et al. |
| 4,781,023 | A | 11/1988 | Gordon |
| 4,894,873 | A | 1/1990 | Kiefer et al. |
| 4,954,110 | A | 9/1990 | Warnan |
| 5,112,483 | A | 5/1992 | Cluff |
| 5,132,550 | A | 7/1992 | McCabe |
| 5,186,822 | A | 2/1993 | Tzong et al. |
| 5,359,229 | A | 10/1994 | Youngblood |
| 5,558,459 | A | 9/1996 | Odenbach et al. |
| 5,879,105 | A | 3/1999 | Bishop et al. |
| 6,406,221 | B1 | 6/2002 | Collier |
| 6,451,204 | B1 | 9/2002 | Anderson |
| 6,476,511 | B1 | 11/2002 | Yemm et al. |
| 6,647,716 | B2 | 11/2003 | Boyd |
| 6,863,806 | B2 | 3/2005 | Stark et al. |
| 7,023,104 | B2 | 4/2006 | Kobashikawa |
| 7,042,112 | B2 | 5/2006 | Wood |
| 7,245,041 | B1 | 7/2007 | Olson |
| 7,264,420 | B2 | 9/2007 | Chang |
| 7,443,047 | B2 | 10/2008 | Ottersen |
| 7,579,704 | B2 | 8/2009 | Steenstrup et al. |
| 7,658,843 | B2 | 2/2010 | Krock et al. |
| 7,694,513 | B2 | 4/2010 | Steenstrup et al. |
| 7,728,453 | B2 | 6/2010 | Evans |
| 7,900,571 | B2 | 3/2011 | Jaber et al. |
| 8,564,151 | B1 | 10/2013 | Huenber |
| 8,650,869 | B1 | 2/2014 | McCormick |
| 8,778,176 | B2 | 7/2014 | Murtha et al. |
| 8,784,653 | B2 | 7/2014 | Murtha et al. |
| 8,866,321 | B2 | 10/2014 | McCormick et al. |
| 2003/0010691 | A1 | 1/2003 | Broussard |
| 2003/0121408 | A1 | 7/2003 | Linerode et al. |
| 2006/0012871 | A1 | 6/2006 | Dyhrberg |
| 2006/0283802 | A1 | 12/2006 | Gordon |
| 2007/0108112 | A1 | 5/2007 | Jones et al. |
| 2007/0200353 | A1 | 8/2007 | Ottersen |
| 2009/0084296 | A1 | 4/2009 | McCormick |
| 2010/0054961 | A1 | 3/2010 | Palecek et al. |
| 2010/0320759 | A1 | 12/2010 | Lightfoot et al. |
| 2011/0121572 | A1 | 5/2011 | Levchets et al. |
| 2011/0299927 | A1 | 12/2011 | McCormick et al. |
| 2012/0025532 | A1 | 2/2012 | Song |
| 2012/0067820 | A1 | 3/2012 | Henthorne et al. |
| 2013/0008158 | A1 | 1/2013 | Hon |
| 2013/0008164 | A1 | 1/2013 | Cunningham et al. |

FOREIGN PATENT DOCUMENTS

| | | |
|---|---|---|
| DE | 2248260 | 4/1974 |
| FR | 2437507 | 4/1980 |
| GB | 2113311 | 8/1983 |
| GB | 2459112 | 10/2009 |
| JP | 2002142498 | 5/2002 |
| KR | 20110020077 | 3/2011 |
| WO | WO 95/10706 | 4/1995 |
| WO | WO 01/96738 | 12/2001 |
| WO | WO 03/026954 | 4/2003 |

OTHER PUBLICATIONS

Blevins, Robert D., "Flow-Induced Vibrations," Van Nostrand Reinhold, New York, 1990, pp. 194-213.
Budar, et al., "A Resonant Point Absorber of Ocean-Wave Power," Nature, vol. 256, Aug. 1975, pp. 478-480.

(56) References Cited

OTHER PUBLICATIONS

Cébron, et al., "Vortex-Induced Vibrations Using Wake Oscillator Model Comparison on 2D Response with Experiments," Institute of Thermomechanics, Prague, 2008.
Falnes, Johannes, "Ocean Waves Oscillating Systems," Cambridge University Press, pp. 196-224, 2002.
Farshidianfar, et al., "The Lock-in Phenomenon in VIV Using a Modified Wake Oscillator Model for Both High and Low Mass-Damping Ratio," Iranian Journal of Mechanical Engineering, vol. 10, No. 2, Sep. 2009.
Garnaud, et al, "Comparison of Wave Power Extraction by a Compact Array of Small Buoys and by a Large Buoy," Proceedings of the 8th European Wave and Tidal Energy Conference, Uppsala, Sweden, 2009, pp. 934-942.
Jauvitis, et al., The Effect of Two Degrees of Freedom on Vortex-Induced Vibration at Low Mass and Damping,: J. Fluid Mechanics, vol. 509, 2004, pp. 23-62.
Lee, et al., "On the Floating Breakwater—A New Arrangement," Proceedings, International Conf. on Coastal Engineering, Taipei, 1986, pp. 2017-2022.
Leong, et al., "Two-Degree-of-Freedom Vortex-Induced Vibration of a Pivoted Cylinder Below Critical Mass Ratio," Proceedings of the Royal Society A, vol. 464, 2008, pp. 2907-2927.
Liang, et al., "A Study of Spar Buoy Floating Breakwater," Ocean Engineering, vol. 31, 2004, pp. 43-60.
McCormick, et al., "Full-Scale Experimental Study of Bi-Modal Buoy," Report EW 01-11, Department of Naval Architecture and Ocean Engineering, U.S. Naval Academy, Jun. 2011, 32 pages.
McCormick, et al., "Planing Characteristics of Fast-Water Buoys," Journal of the Waterways Harbors and Coastal and Engineering Division, vol. 99, No. WW4, Nov. 1973, pp. 485-493.
McCormick, et al., "Prototype Study of a Passive Wave-Energy Attenuating Bi-Modal Buoy," Murtech, Inc. Report M-12-1, Jan. 2012, 26 pages.
Miles, John W., "On the Interference Factors for Finned Bodies," J. Aeronautical Sciences, vol. 19, No. 4, Apr. 1952, p. 287.
Murali, et al., "Performance of Cage Floating Breakwater," Journal of Waterway, Port, Costal and Ocean Engineering, Jul./Aug. 1997, pp. 1-8.

Ng, et al., "An Examination of Wake Oscillator Models for Vortex-Induced Vibrations," Naval Undersea Warfare Center Division, Newport, RI, Technical Report 11,298, Aug. 1, 2011, 18 pages.
Ogink, et al., "A Wake Oscillator With Frequency Dependent Coupling for the Modeling of Vortex-Induced Vibration," Journal of Sound and Vibration, No. 329, 2010, pp. 5452-5473.
Rodenbusch, George, "Response of a Pendulum Spar to 2-Dimensional Random Waves and a Uniform Current," Massachusetts Institute of Technology and Woods Hole Oceanographic Institution, Engineering Program, Ph.D. Dissertation, Aug. 1978, 138 pages.
Ryan, et. al., "Energy Transfer in a Vortex Induced Vibrating Tethered Cylinder System", Conf. on Bluff Body Wakes and Vortex-Induced Vibrations, Port Douglas, Australia, Dec. 2002, 4 pages.
Shiguemoto, et al., "Vortex Induced Motions of Subsurface Buoy with a Vertical Riser: A Comparison Between Two Phenomenological Models" Proceedings, 23° Congresso Nacional de Transporte Aquaviário, Construção Naval e Offshore, Rio de Janeiro, Oct. 25-29, 2010, pp. 1-9.
Sobey, et al., "Hydrodynamic of Circular Piles," Proceedings, 6th Australian Hydraulics and Fluid Mechanics Conference, Adelaide, Dec. 1977, pp. 253-256.
Long Beach Water Department, Under-Ocean Floor Seawater intake and Discharge Test Plan, Apr. 1, 2009.
Lovo, Robert, "Initial Evaluation of the Subfloor Water Intake Structure System (SWISS) vs. Conventional Multimedia Pretreatment Techniques," Assistance Agreement No. 98-FC-81/0044, Desalination Research and Development Program Report No. 66, U.S. Dept. of Interior, May 2001.
McCormick, "Ocean Wave Energy Conversion," Wiley-Interscience, New York (1981, reprinted by Dover Publication, Long Island, New York in 2007).
WateReuse Association, "Overview of Desalination Plan Intake Alternatives", Mar. 2011.
International Search Report for related PCT Application No. PCT/US2013/059175 dated Mar. 19, 2014.
International Search Report for related PCT Application No. PCT/US2013/048906 dated Sep. 30, 2013.
International Search Report for corresponding PCT Application No. PCT/US2014/056243 dated Dec. 15, 2014.
International Seach Report for corresponding PCT Application No. PCT/US2016/022438 dated Jun. 21, 2016.

MODULAR SAND FILTRATION-ANCHOR SYSTEM AND WAVE ENERGY WATER DESALINATION SYSTEM AND METHODS OF USING POTABLE WATER PRODUCED BY WAVE ENERGY DESALINATION

CROSS-REFERENCE TO RELATED APPLICATIONS

This U.S. National Phase application claims the benefit under 35 U.S.C. § 371 of PCT Application No. PCT/US2014/056243 filed on Sep. 18, 2014 which claims the benefit under 35 U.S.C. § 120 of application Ser. No. 14/037,684 (now U.S. Pat. No. 8,778,176) filed on Sep. 26, 2013 and entitled "Modular Sand Filtration-Anchor System and Wave Energy Water Desalination System Incorporating the Same" which in turn is a Continuation-in-Part Application, and claims the benefit under 35 U.S.C. § 120, of application Ser. No. 13/929,171 (now U.S. Pat. No. 8,784,653) filed on Jun. 27, 2013 and entitled "Modular Sand Filtration-Anchor System and Wave Energy Water Desalination System Incorporating the Same" which in turn takes the benefit under 35 U.S.C. § 119(e) of Application Ser. No. 61/668,213 filed on Jul. 5, 2012 entitled "Modular Sand Filtration-Anchor System" and all of whose entire disclosures are incorporated by reference. PCT Application No. PCT/US2014/056243 filed on Sep. 18, 2014 which claims the benefit under 35 U.S.C. § 119(e) of Application Ser. No. 62/028,895 filed on Jul. 25, 2014 and entitled "Methods of Using Potable Water Produced by Wave Energy Desalination" and all of whose entire disclosures are also incorporated by reference herein.

BACKGROUND OF THE INVENTION

The present invention is generally directed to the generation of potable water. More particularly, the present invention is directed to articulated wave energy conversion system (AWECS) with reverse osmosis (RO) membranes to generate potable water for various applications.

Desalinization plants are located around the world, and are operated using electricity to pressurize the incoming source water. Depending on the location, there may be pretreatment requirements to optimize the influent for processing through the RO membranes.

The U.S. Department of Interior (DOI) funded the Subfloor Water Intake Structure System (SWISS), currently utilized in desalination plants in California and Japan. The SWISS approach is to install a permanent subfloor well/intake system for the source-water for the traditional shore structures. The in-situ sand provides the filtration media. See, for example, Lovo, Robert, "Initial Evaluation of the Subfloor Water Intake Structure System (SWISS) vs. Conventional Multimedia Pretreatment Techniques," Assistance Agreement No. 98-FC-81-0044, Desalination Research and Development Program Report No. 66, U.S. Dept. of Interior, May 2001.

Ocean wave-energy conversion is directed to the exploitation of ocean wave energy to produce energy in one or more of four forms, those being hydraulic, pneumatic, mechanical or electrical. See McCormick, "Ocean Wave Energy Conversion," published by Wiley-Interscience, New York (1981, reprinted by Dover Publication, Long Island, N.Y. in 2007). The articulated-barge wave-energy conversion system dates back to the 1970's when both Sir Christopher in the United Kingdom and Glen Hagen of the United States suggested the system. The system was studied in the late 1970's by P. Haren (1978) at MIT. He found that the optimum articulated-barge configuration was a three-barge system. In the 1980's, Dr. Peter McCabe showed that the efficiency of the three-barge system could be substantially improved by suspending an inertial-damping plate below the center barge. Dr. McCabe, then, produced a prototype of the system, coined the McCabe Wave Pump (MWP), which was deployed and studied in the Shannon Estuary for approximately nine years. See, U.S. Pat. No. 5,132,550 (McCabe). The MWP was primarily designed as a producer of potable water.

Ocean Energy Systems (OES) is in the business of designing and manufacturing articulated-barge systems to produce potable water by reverse-osmosis (RO) desalination of sea water. U.S. Patent Publication No. 2009/0084296 (McCormick), which is incorporated by reference herein, describes a system directed to a wave-powered device having enhanced motion. In particular, there is disclosed an articulated barge wave energy converter system, which shall hereinafter be referred to as the AWECS. See also U.S. Patent Publication No. 2010/0320759 (Lightfoot, et al.). The AWECS basically comprises a forward barge, a rear barge and an intermediate or center barge, all of which arranged to float on a body of water having waves. The barges are hingedly coupled together so that they can articulate with respect to each other in response to wave motion. The AWECS also includes high-pressure pumps which straddle and pivotably connect the barge-pairs, e.g., at least one pump connects the forward barge and the intermediate barge, and at least another pump connects the rear barge and the intermediate barge. The pumps are designed to draw in the water through a pre-filter, pressurize the water, and deliver the water to an on-board reverse osmosis (RO) desalination system. That system includes an RO membrane. As an incoming wave makes contact with the forward barge first, the hydraulic fluid in the pump(s) coupled between the forward barge and the center barge are driven in a first direction; as the wave continues, the hydraulic fluid in the pump(s) coupled between the rear barge and the center barge are driven in a second opposite direction. The end results are bi-directional hydraulic pumps.

In U.S. Patent Publication No. 2014/0091575 (McCormick, et al.), there is disclosed an AWECS arranged for producing electrical energy from the wave energy. To that end it makes use of an AWECS similar to that described above, except that it can make use of a commercially-available rotary-vane pump to drive a generator to produce the electricity. To that end, the invention of the '575 application entails a floating device having a first portion (e.g., a first barge) movably coupled (e.g., hinged) to a second portion (e.g., a second barge); at least one hydraulic or pneumatic pump (e.g., a linear pump) coupled between the first portion the said second portion, the hydraulic pump driving a hydraulic fluid therein when the first portion moves with respect to the second portion due to wave energy. A fluid rectifier is provided in the AWECS and is in fluid communication with the at least one hydraulic or pneumatic pump, that generates a unidirectional hydraulic or pneumatic fluid flow. A rotary vane pump is coupled to the fluid rectifier. The rotary vane pump uses the unidirectional flow to generate a rotational motion via a drive member. A rotating electrical generator (e.g., a DC generator) is coupled to that drive member, so that the drive member causes the rotating electrical generator to generate electricity when the drive member is rotating.

All references cited herein are incorporated herein by reference in their entireties.

BRIEF SUMMARY OF THE INVENTION

In accordance with one aspect of this invention a system for producing potable water for various applications is provided. The system basically comprises an articulating barge system and at least one filter-anchor. The articulated barge system is arranged for floating on a body of salt water having waves and includes a desalination system to produce potable water from filtered salt water. The barge system is arranged for converting energy of the waves into energy to pump the filtered salt water to the desalination system. The desalination system includes a reverse osmosis membrane, which is arranged to be self-cleaned by the action of the waves on the barge system. The at least one filter-anchor is arranged for placement on the floor of the body of salt water and comprises a filter housing and a filter. The filter housing has an interior chamber, at least one inlet, at least one outlet, and a filter, e.g., a sand filter, located within the filter housing. The at least one inlet is arranged for providing salt water to the filter. The filter is adapted to filter the salt water to produce filtered salt water. The outlet of the at least one filter-anchor is coupled to the desalination system, whereupon the salt water can be drawn into the filter and filtered to produce filtered water which can be pumped from the outlet to the desalination system by the energy of the waves. The potable water produced by the desalination system can then be used for various purposes in accordance with method aspects of this invention (to be discussed later).

In accordance with one preferred embodiment of a system of this invention the inlets for providing sea water to the filter-anchor may provide for a surface intake velocity of less than 0.5 feet per second to restrict incursion of fish larva and macro or micro vertebrae. The filter-anchor may be of a size to permit container transportable via truck transportation. The interior chamber of the filter anchor may be substantially filled with clean, washed, coarse sand, from either a local beach or shoreline source or from sand obtained from a commercial sand source. The filter housing may have hatches between the exterior and the interior chamber which, when opened, provide for submersion of the filter housing via flooding of the interior chamber and controlled sinking of the filter-anchor to the floor of the body of salt water. The filter-anchor, prior to use as a filter, may be floatable and towable to a deployment site in the body of salt water. The filter-anchors may be provided with associated (respective) mooring buoys, which are preferably attached to the filter-anchors by a mooring line. At least one submersible pump and submersible air snorkel may be included such that the filter-anchor is re-floatable when the hatches are in a closed position, wherein the interior chamber is substantially filled with air, wherein the submersible pump and air snorkel are activatable to float the filter-anchor.

Other aspects of this invention entail methods of using potable water produced from salt water using wave energy. Those methods entail floating an articulated barge system on a body of salt water having waves. The barge system includes a desalination system to produce potable water from filtered salt water. The desalination system includes a reverse osmosis membrane. At least one filter-anchor is disposed on the floor of the body of salt water. The filter-anchor comprises a filter housing and a filter. The filter housing has an interior chamber, at least one inlet, at least one outlet, and a filter located within the filter housing. The at least one inlet is arranged for providing salt water to the filter. The filter is adapted to filter the salt water to produce filtered salt water. The method also entails coupling the outlet of the filter-anchor to the desalination system on the barge system and using the barge system to convert the energy of the waves into energy to pump the filtered salt water to the desalination system, whereupon the filtered salt water is converted to potable water utilizing the reverse osmosis membrane. The reverse osmosis membrane is self-cleaned by the action of the waves on the barge system. Among the various applications for using the potable water produced from salt water using wave powered reverse osmosis are the following: producing bottled drinking water; introducing potable drinking water into a drinking water system (e.g., public or private); replenishing an aquifer by introducing potable water into the aquifer; remediating a contaminated aquifer by introducing potable water into the aquifer; remediating contaminated soil by introducing potable water into the soil; effecting drought relief by providing potable water for irrigating crops; effecting material manufacturing by providing potable water for manufacturing a product; effecting material manufacturing by providing potable water for manufacturing a product; and effecting food processing by providing potable water for processing a food.

In accordance with another aspect of this invention methods for pumping seawater using wave energy for various applications are provided. Those methods entail floating an articulated barge system on a body of water (salt or fresh) having waves and using the barge system to convert the energy of the waves into energy to pump the water from the body of water to some location for various applications. Among the various applications for using the pumped water produced by those methods are the following: effecting air conditioning by introducing pumped water into a cooling system; and effecting aquaculture by pumping the water from one location in an aquaculture farm to another location therein to circulate nutrients.

BRIEF DESCRIPTION OF SEVERAL VIEWS OF THE DRAWINGS

The invention will be described in conjunction with the following drawings in which like reference numerals designate like elements and wherein.

DETAILED DESCRIPTION OF THE INVENTION

Figure 1:
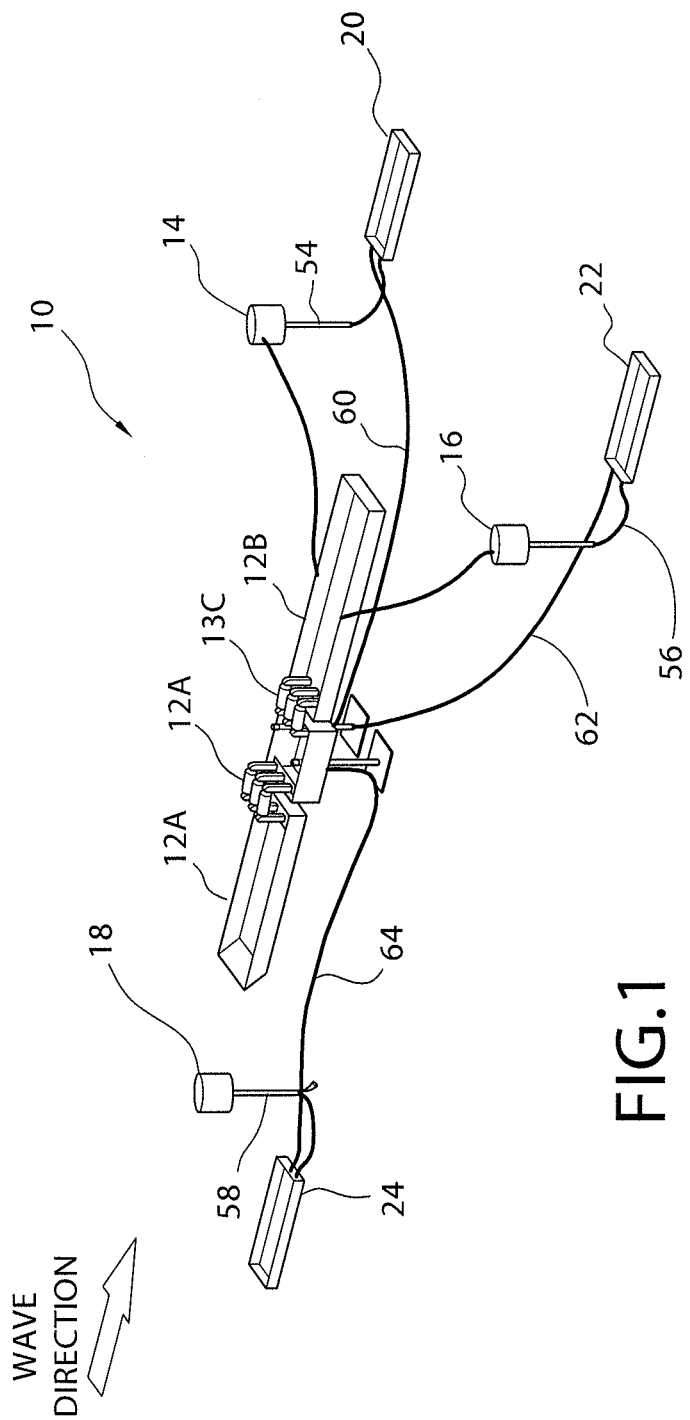
FIG. 1 is a simplified schematic diagram of an articulated wave energy conversion system and a modular sand filtration-anchoring system in accordance with an exemplary embodiment of the present invention.

Referring now to the drawing wherein like characters refer to like parts, there is shown in FIG. 1 a system for producing potable water from salt water in a body of water, e.g., a sea, having waves. The system basically comprises an AWECS and a portable filtration-anchor system. The AWECS is a system in the form of articulated barge and includes a desalination system. The desalination system is constructed similarly to the AWECS described above, e.g., it includes a forward barge 12A, a rear barge 12B and an intermediate or center barge 12C. The barges are hinged to each other and include at least one pump 13A straddling the forward barge 12A and center barge 12C and at least one pump 13B straddling the rear barge 12B and center barge 12C. A reverse osmosis membrane 15 is disposed in one of the barges and is arranged to process filtered salt water provided from the portable filtration-anchor system to produce potable water. The portable filtration-anchor system is arranged for disposition on the floor or bed of the body of salt water to filter the salt water which is brought into it and to provide the filtered salt water to the desalination system on the articulated barge system. Power for drawing the salt water from the body of water into the filter-anchor, where it is filtered into filtered salt water, and for providing the filtered saltwater to the desalination system on the articulated barge system is accomplished by the action of the waves of the body of water on the barge system. In particular, as will be discussed in detail later the AWECS includes pumps which are powered by the energy extracted from the action of the waves on the barge system.

The system for producing potable water will be illustrated in more detail with reference to the following embodiments, but it should be understood that the present invention is not deemed to be limited thereto. To that end, one exemplary embodiment of an AWECS 10 constructed in accordance with an exemplary embodiment of the present invention is shown in FIG. 1 and includes the three previously identified articulated barges 12A, 12B and 12C. The barges are anchored using, for example, a 3-point anchoring system utilizing mooring buoys 14, 16, 18 having filter-anchor units 20, 22, 24. The filter-anchor units 20, 22, 24 form one exemplary embodiment of the portable filtration-anchor system and serve as intakes for the articulated barges, allowing seawater to be pre-filtered prior to entering designated barges, with negligible effects on aquatic life. This system is, for example, a containerized version of the SWISS (as discussed in the Background, above).

The seawater will be pressurized and processed through an onboard reverse osmosis system. The onboard reverse osmosis system can be of any suitable construction and includes a conventional reverse osmosis (RO) membrane 15. The reverse osmosis system operates in a conventional manner to produce potable water from salt water exposed to the RO membrane. However, the fact that the RO membrane is located in the articulated barge system renders it self-cleaning. In this regard, since the barge system is floating on the body of salt water where it is exposed to the rocking action of the waves (an exemplary direction of the wave flow is shown by the arrow in FIG. 1), this rocking action effectively shakes or otherwise disturbs the RO membrane to effectively clean it. Thus, the RO membrane is effectively self-cleaning.

For the design sea (for example, a 1.5-meter significant wave height and 7-second period), the exemplary potable water producing system of this invention shown in FIG. 1 and described further below can produce an average of 100,000 gallons per day (gpd) of potable water. This value is based on 200,000 gpd of source water taken in through the sand filtration system. However, it is intended that the AWECS 10 will operate in greater and lesser seas, wherein the potable-water production will vary with the sea conditions.

The filter-anchor units 20, 22, 24 are preferably built to be transportable via over-the-road trucking (as are all of the AWECS components).

Figure 3:
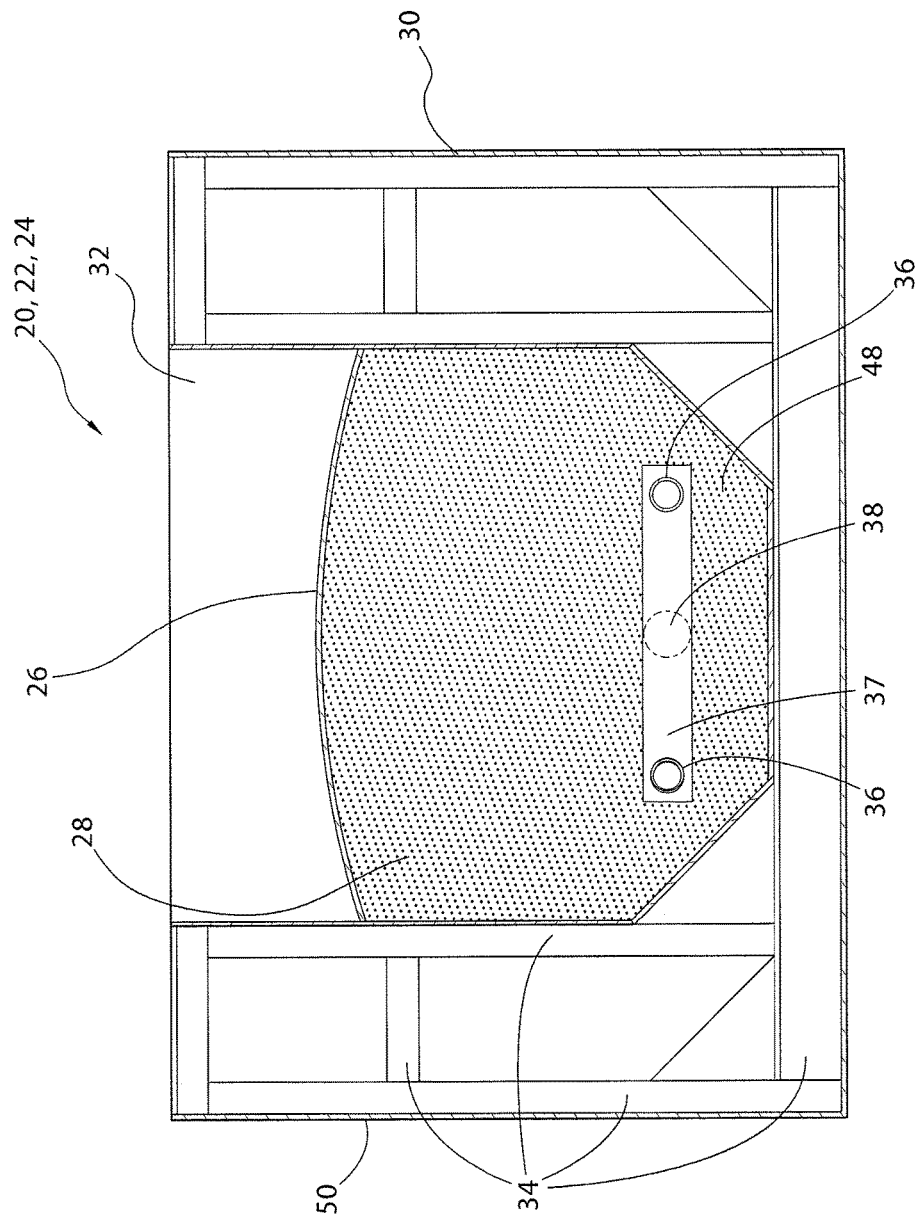
FIG. 3 is a front cross-section view of the modular sand filtration-anchoring system of FIG. 1.
Figure 4:
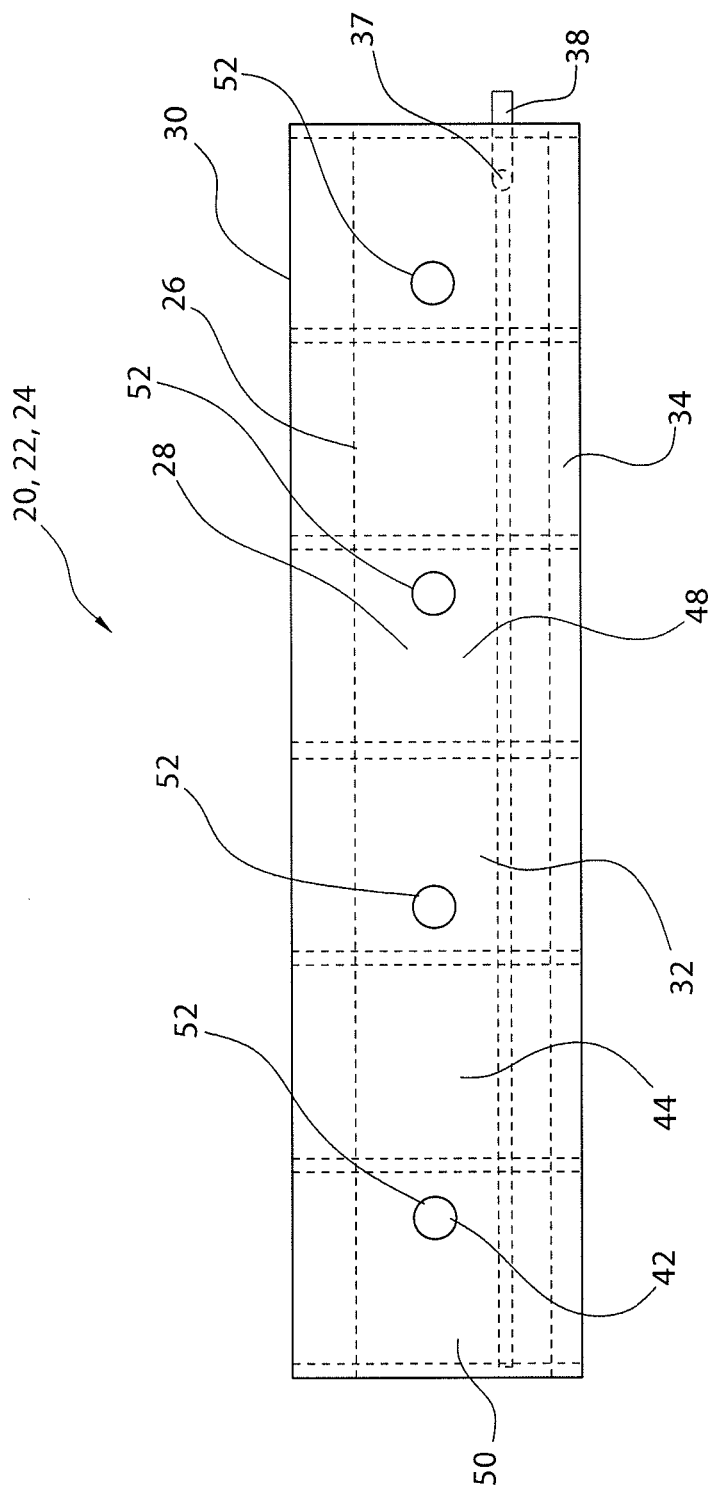
FIG. 4 is a side elevation view of the modular sand filtration-anchoring system of FIG. 1.
Figure 5:
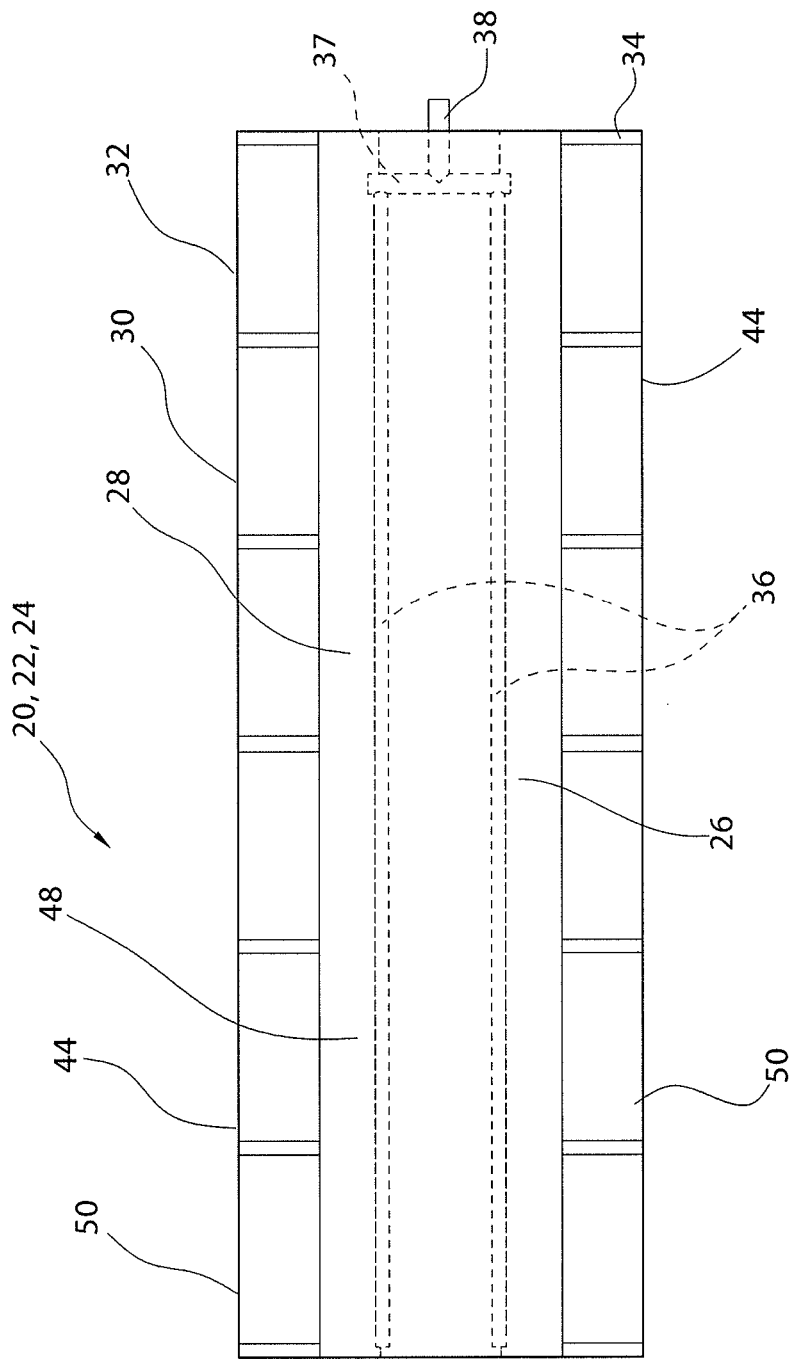
FIG. 5 is a top, plan view of the modular sand filtration-anchoring system of FIG. 1.

As can be seen in FIGS. 3 and 5, and which will be described later, the small barge-like filter-anchors 20, 22, 24 include respective interior chambers 48, which are preferably lined with a porous fabric, such as a woven geotextile bag 26 (e.g., a Geotube® brand permeable fabric) filled with sand 28. The permeability of the geotextile is in gallons per square feet. It will not be the restricting permeability of the system. As an alternative to a bag 26, a porous cover, formed of the same material as the bag 26, may be provided over the body of sand within the chamber 48 to hold the sand in place within the chamber.

The sand 28 to be used in the filter-anchors 20, 22, 24 is preferably coarse washed sand placed into the geotextile bag 26. The estimated coefficient of permeability (K) of the sand is expected to be between 0.003 and 0.00003 ft/s. Any combination of engineered sand and gravel may be used to obtain best filtering results It is anticipated that (for example) 200,000 gpd of supply water will be pulled through the three filter-anchors 20, 22, 24 in the present example. In this exemplary embodiment, the surface area for a single filter may be 30'×6' or 180 square feet. For three such filter-anchors 20, 22, 24, the surface area would be approximately 540 square feet. At a rate of 0.003 fps, all three units would allow 1.62 cubic feet/second or 12.1 gallons/second. This translates to 726 gallons per minute or 1,045,440 gallons per day. Each modular filter-anchor 20, 22, 24 is estimated to handle approximately 348,480 gallons/day, depending on the sea state.

As stated above, the AWECS 10 is designed to be deployed (e.g., floated) in a body of salt water, e.g., sea having, for example, a 1.5-meter significant wave height and seven-second period. However, the AWECS 10 will operate in greater and lesser seas or bodies of salt water, and the potable-water production will vary with the sea/salt water conditions.

As can be seen in FIGS. 2-5, each filter-anchor 20, 22, 24 is in the form of a modular filter housing 30 having an exterior 50 and an interior chamber 48. The woven geotextile bag 26 with the sand 28 therein is disposed within the interior chamber 48. The housing 50 includes at least one inlet 52 for providing sea water to the interior chamber 48, and at least one water conduction outlet conduit 38 for enabling the filtered water to exit (i.e., be pumped out) the interior chamber 48.

The filter-anchor 20 includes at least one feed line 36 located in the interior chamber 48 to provide the filtered water to the water conduction outlet conduit 38. The feed lines 36 are perforated or otherwise allow for the salt water filtered by the sand that is in chamber 48 to enter the lines 36. The feed lines 36 can be V-line well piping. Only water that passes through the filter (e.g., the geotextile bag 26) may enter the feed lines 36.

The modular filter housing 30 may be constructed from steel sheet 32. The at least one inlet 52 may be in the form of apertures or openings in the side of the filter housing 30 and may have manually or automatically controlled hatches to control water flow therethrough.

Referring now to FIGS. 2-5 more details of the construction of the modular filter housing 30 will be provided. To that end, each housing 30 is a barge-like structure that can be floated into place adjacent the AWECS. That is, the modular filter housing 30 will, first, be able to barge the sand 28 in the geotextile bag 26 to the site where it will be used to make potable water. The sheet steel 32 will be used for the skin, for example, is approximately ⅜ inch thick. There will be various beam members 34 either I-beams or channel beams to provide structural support for the housing. Moreover, the modular filter housing 30 will preferably be protected from electrolysis using sacrificial zinc anodic protection. It may also be painted to reduce the surface corrosion, as determined necessary. While the exemplary embodiment of the filter housing 30 is shown and described as being formed of sheet steel, other materials can be used. For example, another possible material for the filter housing 30 may be concrete.

The geotextile bag 26 may be, for example, polyethylene, woven fabric. Seam strength may be, for example, approximately 450 pounds per inch pull. The bag 26 (or a porous cover formed of the same material as the bag) serves to keep the sand 28 from washing from the submerged filter structure.

The feed lines 36 may be constructed of, for example, high density polyethylene, and may be encased in filter fabric and stone sleeve to prevent sand 28 from being pulled into the feed lines 36.

The feed lines 36 serve to transport filtered salt water, e.g., sea water, through a manifold 37 to preferably, a single water conduction outlet conduit 38 that is, for example, six inches in diameter. The water conduction conduit 38 penetrates the filter housing 30 and is the source for water lines 60, 62, 64 (see FIG. 1) extending to the AWECS pumps. For example, two four-inch feed lines 36 connect to the six-inch water conduction outlet conduit 38. The operation of the AWECS pumps 13A and 13B pulls the filtered sea water from the chamber 48 to the reverse osmosis membrane 15 in the AWECS. The power for operating the pumps is provided by the wave energy captured by the articulating barges 12A-12C.

Figure 2:
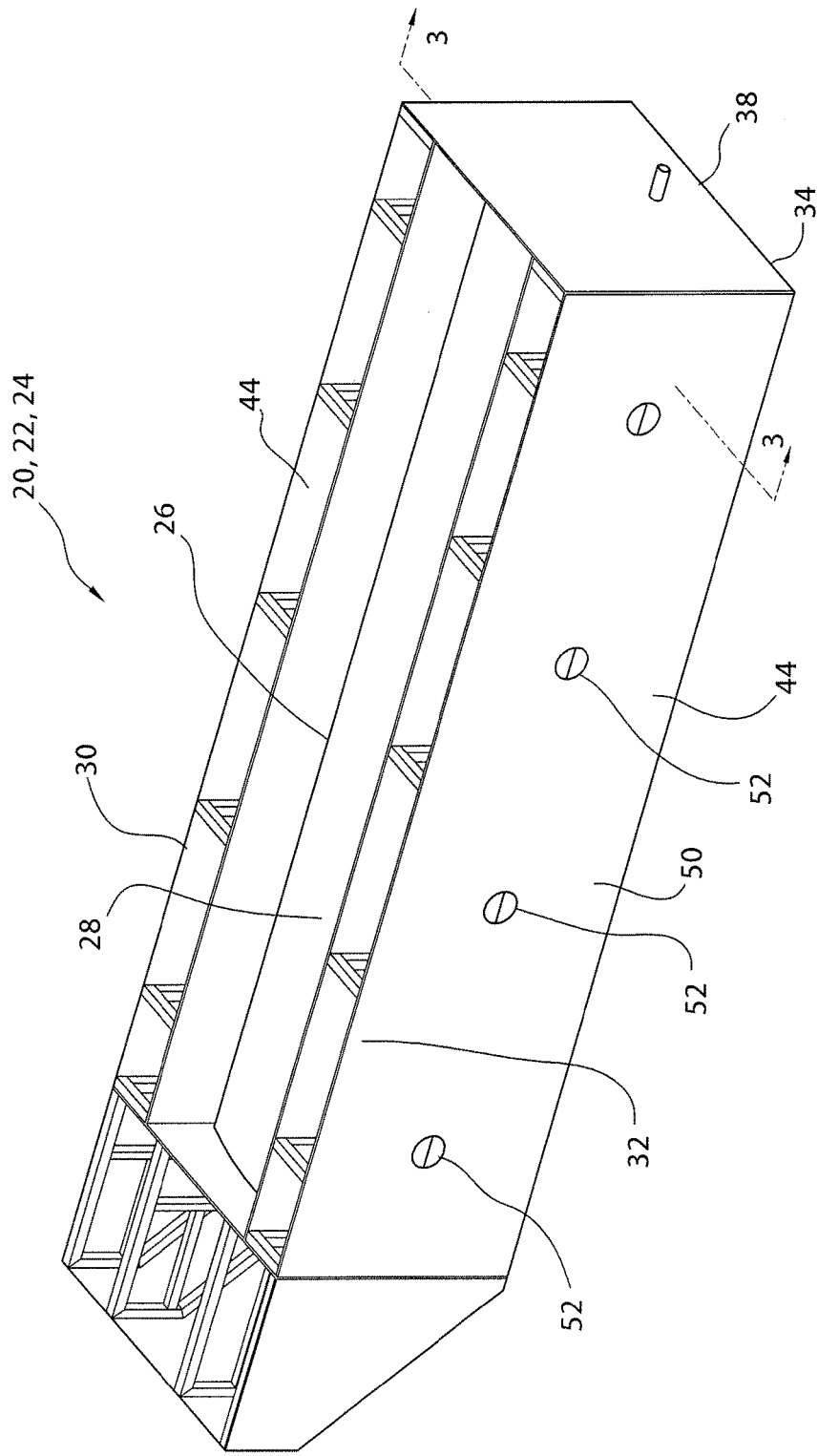
FIG. 2 is an isometric view of the modular sand filtration-anchoring system of FIG. 1.

As can be seen in schematically in FIG. 2, the filter housing 30 may have manually-operated scuttles or hatches at the inlets 52 in the sides 44 of the housing to allow for flooding of the entire filter housing 30. The number of hatches will be sufficient to allow for a controlled submersion and re-flotation of the unit. The re-flotation will be done by, first, attaching a snorkel (not shown) through the free-surface of the water and, then, using a submerged pump (not shown) to de-water the filter system. Air is drawn in through the snorkel to replace the purged water in the bilge and gunnel areas of the modular filter-anchors 20, 22, 24. The filter housing 30 may be capped and made water tight prior to re-float to allow removal of as much water as possible from this area to provide the additional buoyancy required for re-float.

A method of anchoring a wave energy conversion system 10 and providing filtered water to the desalination system is also provided. The method includes the steps of towing an articulated barges for converting wave energy into energy used to pump water to an RO membrane to generate potable water to a location in an ocean, sea or other salt water body having waves, towing at least one filter-anchor 20, 22, 24 (as described above) to the same location and sinking each filter-anchor to the ocean bed. That action is accomplished by filling the interior chamber of the filter housing with water. A mooring buoy 14, 16, 18 is provided for each filter-anchor 20, 22, 24 at their respective locations. The mooring buoys 14, 16, 18 are attached to respective ones of the filter-anchors 20, 22, 24 by respective mooring lines 54, 56, 58. The filter-anchors 20, 22, 24 are attached to the articulated barges 12. Source salt water to the RO membrane is then provided from the filter-anchors via the water lines 60, 62 and 64 by the operation of the AWECS pumps.

Figure 6:
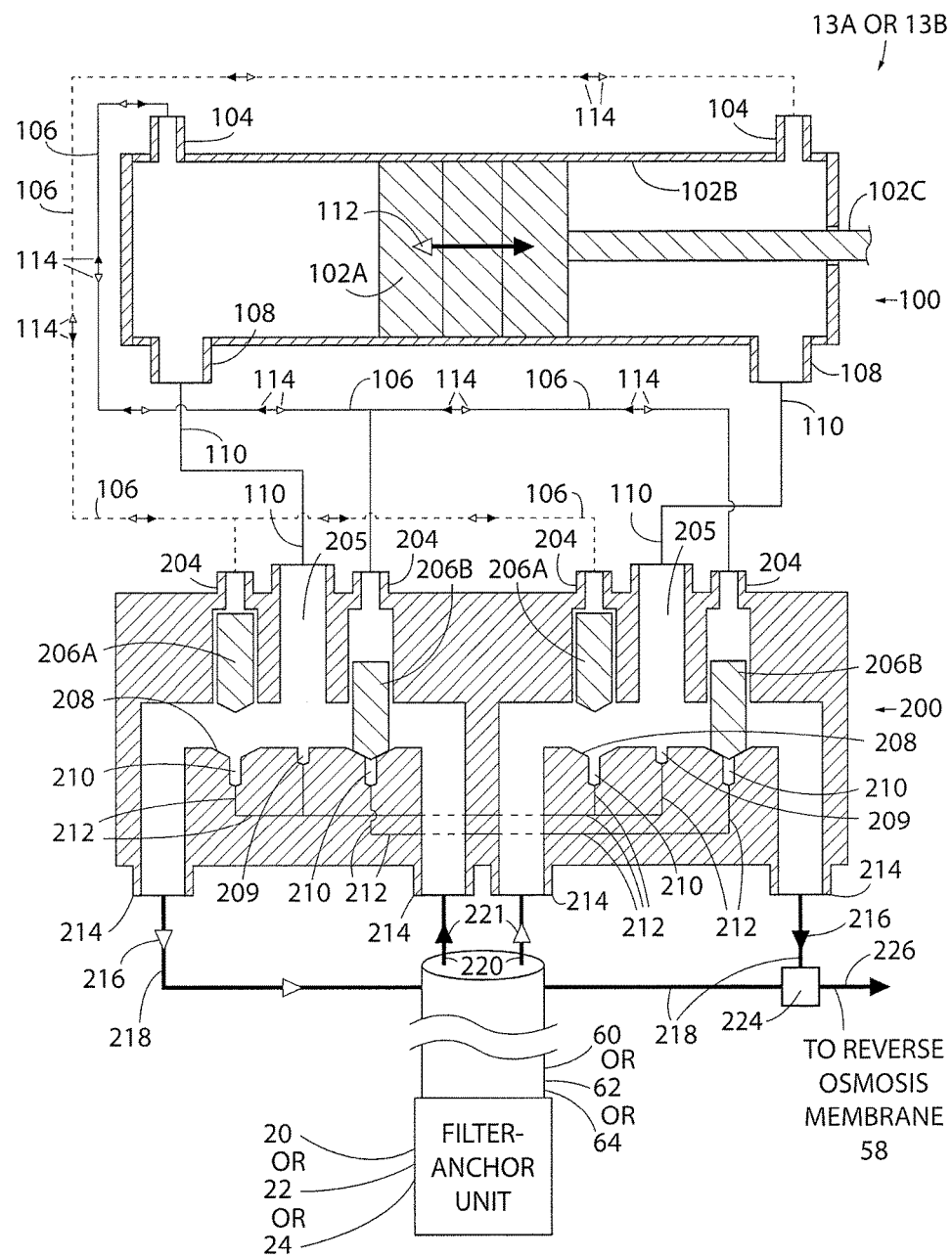
FIG. 6 is a functional diagram of an AWECS pump depicting how a high pressure flow of filter sea water is generated by wave motion of the barges for provision to a RO membrane in the barges to produce potable water thereat.

As mentioned earlier, the AWECS pumps 13A and 13B pull the filtered sea water from the chamber 48 to the reverse osmosis membrane 15. As shown most clearly in FIG. 6, an AWECS pump (13A or 13B) comprises a bi-directional linear pump 100 that is powered by the relative motions of the barges 12A/12C or 12B/12C via movable couplings (e.g., hinges). As can be appreciated from FIG. 6, movement of a piston 102A within a piston chamber 102B as driven by a piston rod 102C whose other end (not shown) is coupled to either barge 12A or 12B, causes sea water from a filter-anchor unit to be moved in opposite linear directions. As a result, a "flow rectifier" 200 is required to convert this bi-directional sea water flow into a unidirectional fluid flow. This unidirectional sea water flow is then delivered to the reverse osmosis membrane 15. The housing 102B comprises pressure taps 104 that feed into corresponding pressure tap pairs 204 in the flow rectifier 200 via control pressure lines 106. Intake/Exhaust taps 108 are coupled via intake/exhaust lines 110 respectively to rectifier passageways 205. Rectifier valve pairs 206A and 206B (e.g., cone-head valves) correspond to the pressure tap pairs 204. The valves 206A/206B are received in valve seats 208 when the valves are closed. Pressure relief taps 209 are provided and wherein seat pressure relief taps 210 are coupled via pressure relief lines 212. Flow ports 214 act as the input ports for the sea water and are in fluid communication with a corresponding filter-anchor unit 20, 22 or 24. Arrows 112 indicate the corresponding piston motion direction while arrows 114 indicate the pressure-force direction. Arrows 216 indicate the sea water flow direction. The high-pressure sea water feed flow line is indicated by 218 while the low-pressure intake flow line is indicated by 220. A high pressure manifold 222 takes the high-pressure sea water flow via path 224 to the reverse osmosis membrane 50.

In operation, the piston/rod assembly 102A/102C is excited by an alternating energy source, namely, the water waves. The piston/rod assembly 102A/102C travels in alternating directions over the period associated with the water wave in the piston housing 102B. The motions create alternating pressures in the taps 104/204 due to the alternating piston-rod assembly motions 112. The alternating pressures are transmitted through the control pressure lines 106, producing alternating pressure forces with directions shown as 114. The piston-rod assembly motions 112 cause the sea water in the pump 100 to be alternatively expelled at high pressure and refilled at low pressure through the intake/exhaust taps 108. The alternating flows through the taps 108 are transmitted through the intake/exhaust lines 110. The pressure forces 114 in the control pressure lines 106 alternately cause the cone-head valves 206A and 206B to open and close. The cone-head of the valves mate with the conical valve seats 208 when the valve is closed. When the valve is to be opened by the pressure force 114, sea water is passed into the seat 208 through the seat pressure relief tap 210 which is partially supplied by the pressure relief tap 209. The taps 209 and 210 are interconnected by the pressure relief lines 212. The resulting flows in the sea water flow ports 214 are in the directions indicated by 220. In particular, the high pressure flow in the high pressure feed flow lines 218 travel in the direction 216. The low pressure flow in the low pressure intake flow lines 220 in the direction 221 come from the corresponding filter-anchor unit 20, 22 or 24. The high pressure flow components through flow lines 218 are combined in a manifold 224 and this combined flow 226 is supplied to the reverse osmosis membrane 58.

Figure 7:
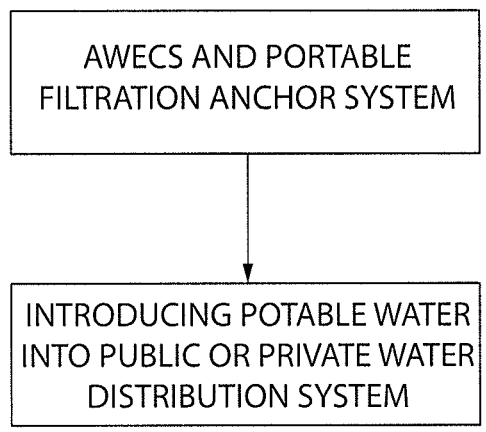
FIG. 7 is a block diagram showing one exemplary method of utilizing potable water produced by the systems of this invention for one desired application, e.g., introducing potable water into a public or private water distribution system.

The potable or pure water produced by the systems of this invention can be utilized in various ways in accordance with various methods of this invention. For example the potable water produced by the systems of this invention can be supplied either directly or indirectly to public or privately owned water distribution systems, such as shown in FIG. 7. That can be accomplished by use of a distribution system including conduits, valves, meters, etc. which couple the AWECS to an inlet of the public or privately owned water distribution system.

Figure 8:
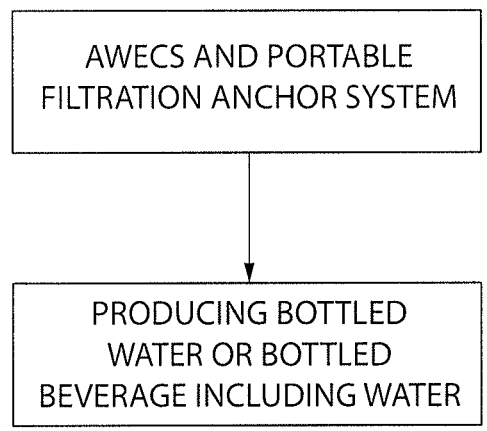
FIG. 8 is a block diagram showing another exemplary method of utilizing potable water produced by the systems of this invention for another desired application, e.g., producing bottled drinking water.

The potable water produced by the systems of this invention can be supplied to water bottlers for the production of bottled drinking water, such as shown in FIG. 8. Alternatively the potable water can be used to supply bottled water for disaster relief applications. For example, the systems of this can be deployed to areas that recently experienced natural or man-made disasters that have rendered the localized water supply inoperable or unsafe, such as Haiti, Fukishima, and other disaster regions that require outside sources of potable water. The systems can then be operated to produce potable water which can be bottled for distribution to the persons affected by the disaster.

Figure 13:
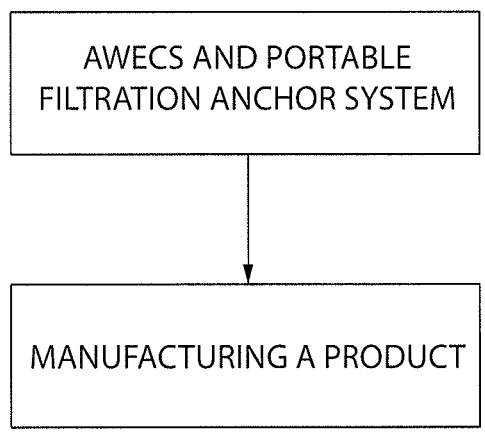
FIG. 13 is a block diagram showing another exemplary method of utilizing potable water produced by the systems of this invention for another desired application, e.g., material manufacturing by providing the potable water for manufacturing a product.
Figure 14:
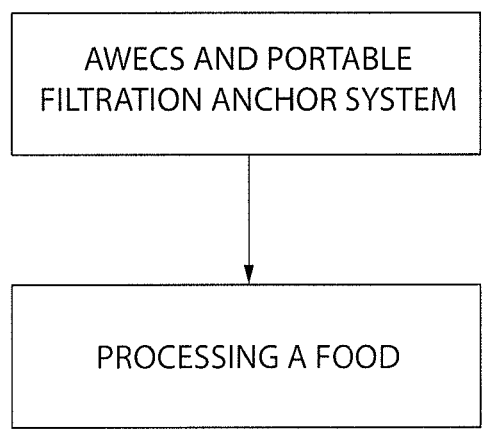
FIG. 14 is a block diagram showing another exemplary method of utilizing potable water produced by the systems of this invention for another desired application, e.g., food processing by providing the potable water for processing a food.

The systems of this invention can also be used in accordance with another method of this invention to serve as a fresh water source for material manufacturing, such as shown in FIG. 13, and food processing, such as shown in FIG. 14, since the water produced by the reverse osmosis system of the AWECS is very pure.

Figure 12:
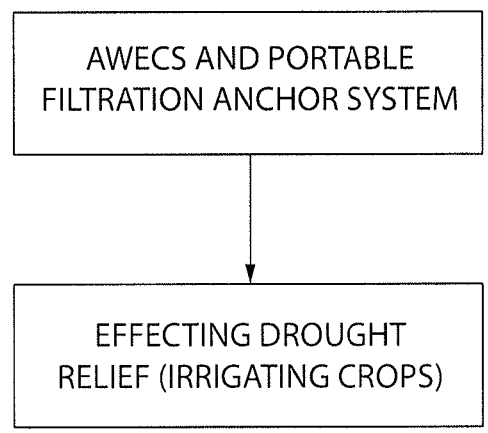
FIG. 12 is a block diagram showing another exemplary method of utilizing potable water produced by the systems of this invention for another desired application, e.g., drought relief by providing the potable water for irrigating crops.

The systems of this invention can be deployed to provide drought relief in accordance with another method of this invention, such as shown in FIG. 12. In particular, there are productive agriculture techniques that use both fresh and salt water to support the growth of the crops. The AWECS can provide either water source, with salt water pumping into irrigation distribution networks, being a viable capability of the AWECS.

Figure 9:
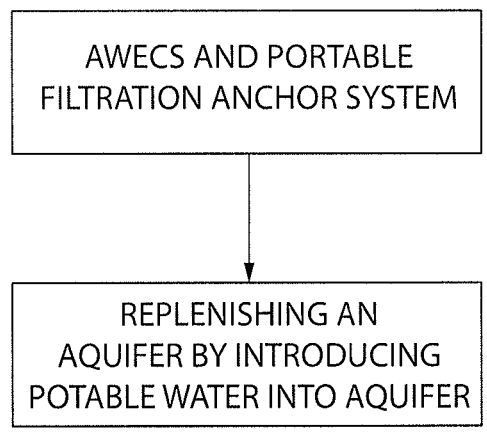
FIG. 9 is a block diagram showing another exemplary method of utilizing potable water produced by the systems of this invention for another desired application, e.g., replenishing an aquifer by introducing the potable water into the aquifer.

The systems of this invention can be deployed for aquifer recharging applications in accordance with still another method of this invention, such as shown in FIG. 9. For example, it is well known that existing water aquifers are being drained at a significant, and perhaps alarming, rate. One of the more publicized examples is in the State of Florida, where the freshwater levels have dropped significantly, creating dangerous sinkholes. The potable water produced by the AWECS can be used to recharge the aquifer and thereby stabilize the sinkhole situation. In fact, the systems of this invention can be used in accordance with methods of this invention to recharge or replenish aquifers for any reason, such as shown in FIG. 9. Such recharging or replenishing could provide a natural and far-reaching water distribution mechanism for regions where the aquifers are in danger.

Figure 10:
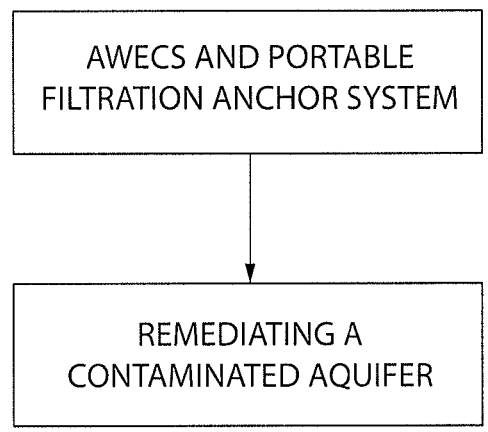
FIG. 10 is a block diagram showing another exemplary method of utilizing potable water produced by the systems of this invention for another desired application, e.g., remediating a contaminated aquifer by introducing the potable water into the aquifer.
Figure 11:
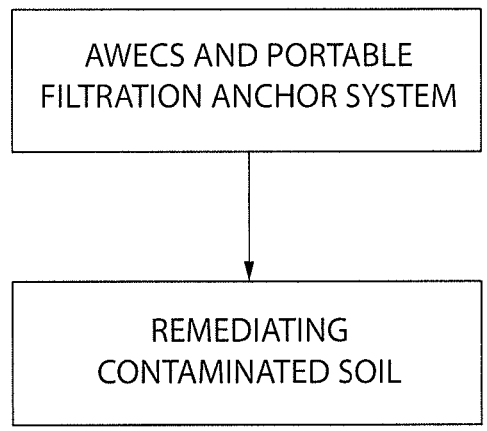
FIG. 11 is a block diagram showing another exemplary method of utilizing potable water produced by the systems of this invention for another desired application, e.g., remediating contaminated soil by introducing the potable water into the soil.

The systems of this invention can be deployed for remediation of aquifer contamination, such as shown in FIG. 10 and/or ground or soil contamination, such as shown in FIG. 11, in accordance with yet other methods of this invention. In this regard, there is a significant issue with ground and/or aquifer contamination that has been plaguing industrial-based societies, where the contamination has occurred many decades into the past but remains extant. Existing techniques for remediation include pumping and treating of the contaminated water, and the infusion of air into the geological substrate to flush out the easily volatilized contaminate. With the production of pure water by the systems of this invention, the infusion of potable water back into the ground can assist in the flushing of the contaminants from the ground, thereby providing a viable and low cost remediation technique.

Figure 15:
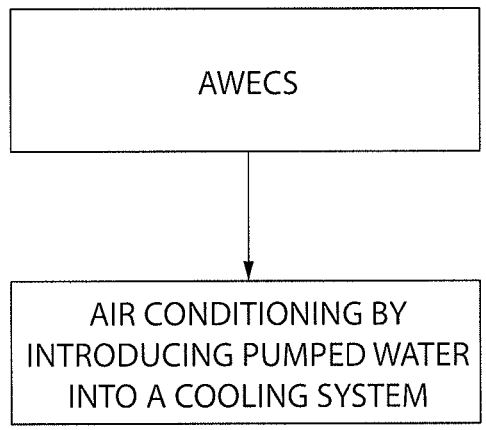
FIG. 15 is a block diagram showing another exemplary method of utilizing water pumped from a body of water utilizing wave action for a desired application, e.g., air conditioning by introducing pumped water into a cooling system.
Figure 16:
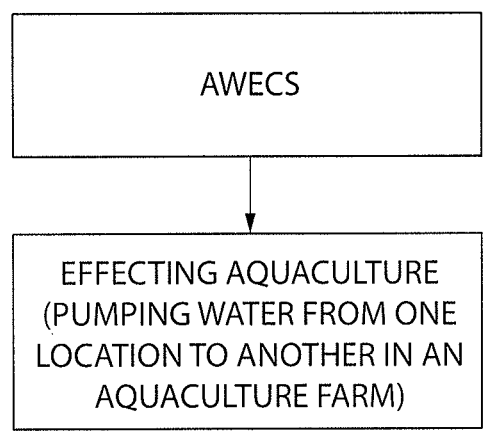
FIG. 16 is a block diagram showing another exemplary method of utilizing water pumped from a body of water utilizing wave action for a desired application, e.g., aquaculture by pumping the water from one location in an aquaculture farm to another location therein to circulate nutrients.

It should be pointed out at this juncture that the AWECS can be used to merely pump seawater without treating that water with reverse osmosis in accordance with another method of this invention. For example, the AWECS can be used, as shown in FIG. 15, for effecting air conditioning by introducing water (salt or fresh) pumped by wave action from a body of water into a cooling system. Alternatively, it can be used, as shown in FIG. 16, in aquaculture farms to pump salt or fresh water from one location to another to circulate nutrients where the temperature gradients create stagnant or oxygen deficient conditions.

While the invention has been described in detail and with reference to specific embodiments thereof and methods of use, it will be apparent to one skilled in the art that various changes and modifications can be made therein without departing from the spirit and scope thereof.

What is claimed is:

1. A method of producing potable water for a desired application comprising:
   (a) floating an articulated barge system on a body of salt water having waves, the barge system including a desalination system to produce potable water from filtered salt water and wherein at least one bi-directional pump is positioned between portions of the barge system that articulate based on wave motion to drive the at least one bi-directional pump in two alternating directions, the desalination system including a reverse osmosis membrane;
   (b) disposing at least one filter-anchor on the floor of the body of salt water, the filter anchor comprises a filter housing and a filter, the filter housing having an interior chamber, at least one inlet, at least one outlet in fluid communication with said at least one bi-directional pump, and a filter located within the filter housing, the at least one inlet being arranged for providing salt water through the filter, the filter being adapted to filter the salt water to produce filtered salt water whenever the pump is energized by wave motion to pull salt water from said at least one inlet, through said filter and into said outlet;
   (c) coupling the outlet to an input to a flow rectifier and coupling an output of said flow rectifier to the desalination system;
   (d) utilizing the barge system to convert the energy of the waves into energy to pump the filtered salt water, moved in two alternating directions by said at least one bi-directional pump and rectified into a unidirectional filtered salt water flow by said flow rectifier to the desalination system, whereupon the filtered salt water is converted to potable water utilizing the reverse osmosis membrane, the reverse osmosis membrane being self-cleaned by the action of the waves on the barge system; and
   (e) providing the potable water for use in the desired application.

2. The method of claim 1 wherein the desired application comprises bottling the potable water.

3. The method of claim 1 wherein the desired application comprises replenishing an aquifer by introducing the potable water into the aquifer.

4. The method of claim 1 wherein the desired application comprises remediating a contaminated aquifer by introducing the potable water into the aquifer.

5. The method of claim 1 wherein the desired application comprises remediating contaminated soil by introducing the potable water into the soil.

6. The method of claim 1 wherein the desired application comprises drought relief by providing the potable water for irrigating crops.

7. The method of claim 1 wherein the desired application comprises material manufacturing by providing the potable water for manufacturing a product.

8. The method of claim 1 wherein the desired application comprises food processing by providing the potable water for processing a food.

9. The method of claim 1 wherein the desired application comprises air conditioning by providing the pumped water into a cooling system.

10. The method of claim 1 wherein the desired application comprises aquaculture and wherein the water is pumped from one location in an aquaculture farm to another location therein to circulate nutrients.

11. A method of producing potable water for a desired application comprising:
    (a) floating an articulated barge system on a body of fresh water having waves, the barge system including a reverse osmosis membrane to produce potable water from filtered fresh water and wherein at least one bi-directional pump is positioned between portions of the barge system that articulate based on wave motion to drive the at least one bi-directional pump in two alternating directions;
    (b) disposing at least one filter-anchor on the floor of the body of fresh water, the filter anchor comprises a filter housing and a filter, the filter housing having an interior chamber, at least one inlet, at least one outlet in fluid communication with said at least one bi-directional pump, and a filter located within the filter housing, the at least one inlet being arranged for providing fresh water through the filter, the filter being adapted to filter the fresh water to produce filtered fresh water whenever the pump is energized by wave motion to pull fresh water from said at least one inlet, through said filter and into said outlet;
    (c) coupling the outlet to an input to a flow rectifier and coupling an output of said flow rectifier to the reverse osmosis membrane;
    (d) utilizing the barge system to convert the energy of the waves into energy to pump the filtered salt water, moved in two alternating directions by said at least one bi-directional pump and rectified into a unidirectional filtered fresh water flow by said flow rectifier to the reverse osmosis membrane, whereupon the filtered fresh water is converted to potable water utilizing the reverse osmosis membrane, the reverse osmosis membrane being self-cleaned by the action of the waves on the barge system; and
    (e) providing the potable water for use in the desired application.

12. The method of claim 11 wherein the desired application comprises bottling the potable water.

13. The method of claim 11 wherein the desired application comprises replenishing an aquifer by introducing the potable water into the aquifer.

14. The method of claim 11 wherein the desired application comprises remediating a contaminated aquifer by introducing the potable water into the aquifer.

15. The method of claim 11 wherein the desired application comprises remediating contaminated soil by introducing the potable water into the soil.

16. The method of claim 11 wherein the desired application comprises drought relief by providing the potable water for irrigating crops.

17. The method of claim 11 wherein the desired application comprises material manufacturing by providing the potable water for manufacturing a product.

18. The method of claim 11 wherein the desired application comprises food processing by providing the potable water for processing a food.

19. The method of claim 11 wherein the desired application comprises air conditioning by providing the pumped water into a cooling system.

20. The method of claim 11 wherein the desired application comprises aquaculture and wherein the water is pumped from one location in an aquaculture farm to another location therein to circulate nutrients.

* * * * *